United States Patent [19]

Franks

[11] Patent Number: 4,608,760
[45] Date of Patent: Sep. 2, 1986

[54] FRAME ALIGNMENT INDICATOR

[76] Inventor: Connie Franks, 7509 Haymarket La., Raleigh, N.C. 27609

[21] Appl. No.: 754,748

[22] Filed: Jul. 15, 1985

[51] Int. Cl.⁴ .............................................. G01B 5/25
[52] U.S. Cl. .................................. 33/180 AT; 33/288
[58] Field of Search ........... 33/180 AT, 181 AT, 264, 33/288, 533

[56] References Cited

U.S. PATENT DOCUMENTS

| | | | |
|---|---|---|---|
| 2,798,296 | 7/1957 | Liskey | 33/288 |
| 2,853,790 | 9/1958 | Mac Millan | 33/180 AT |
| 3,805,396 | 4/1974 | Hunnicutt | 33/180 AT |
| 4,015,339 | 4/1977 | Hörvallius | 33/288 |
| 4,375,131 | 3/1983 | Jarman et al. | 33/288 |
| 4,386,468 | 6/1983 | Whitney | 33/180 AT |
| 4,523,384 | 6/1985 | Giacomini | 33/288 |
| 4,539,758 | 9/1985 | Riutta | 33/288 |

FOREIGN PATENT DOCUMENTS 219  1/1985  World Int. Prop. O ............ 33/533

Primary Examiner—Richard R. Stearns
Attorney, Agent, or Firm—Mills and Coats

[57] ABSTRACT

This invention is a means for indicating the alignment or non-alignment of vehicle type frames. The device clips over a portion of the frame with an indicator arm terminating in an indicator finger which, if in alignment, will point toward a pre-determined location on the frame. If the frame is not in alignment, this is also readily apparent by the indicator being off the pre-determined location.

9 Claims, 3 Drawing Figures

FRAME ALIGNMENT INDICATOR

FIELD OF INVENTION

This invention relates to indicators and more particularly to means for determining the alignment or misalignment of vehicle frames.

BACKGROUND OF INVENTION

It is well known that when the frame of a vehicle is bent or otherwise not in correct alignment, the tires thereof wear excessively, the vehicle quite often does not tract properly, and even mechanical parts such as wheels, bearings, and the like can be adversely affected.

The development in recent years of integral frames and bodies allows automobiles to be built of much lighter construction which of course is fuel efficient, however, the strength of the formally used heavy frames with separate bodies has been sacrificed. It is not unusual today to find motor vehicles and particularly passenger cars with frames out of line. This can be caused not only by wrecks (which was formerly the main frame bender), but today can be caused by the hitting of potholes in the road, running over curbs, and similar relatively minor impacts.

Since only a slight out of alignment condition can cause tire wear and mechanical problems, it is desirable to frequently check frames for alignment and to correct any problems found. The main difficulty encountered by mechanics checking for possible faulty frame alignment is in determining whether there actually is a misalignment. Unless there is a bad misalignment, it is usually difficult or impossible to visually tell the condition of a frame.

The present means for aiding and checking and inspecting frames are antiquated, are complicated to use, are time consuming, and quite often are of questionable accuracy.

Also, when a frame is found to be bent it must of course be straightened. During the straightening process it must be checked several times until the exact desired alignment is obtained. Again this is a tedious laborious job and as mentioned before quite often is of questionable accuracy.

After much research and study into the above-mentioned problems the present invention has been developed to provide a simple, inexpensive and yet highly accurate frame alignment determining means.

The above is accomplished through the provision of an alignment indicator that clips onto part of the frame with an elongated alignment indicator finger outwardly extending to a point adjacent the end of the frame member. If the frame is in alignment, the end of the finger will point to a known location. Likewise, if the frame is bent this can be readily determined by the non-alignment of the tip of the indicator with the known location.

Also, during the straightening process, whether the correct alignment has been achieved can be readily determined. The present invention is simple in structure, easy to use, and highly accurate in results obtained.

In view of the above, it is an object of the present invention to provide a simple, inexpensive and yet highly accurate alignment determining means.

Another object of the present invention is to provide an alignment determining means which can be installed and removed in seconds thus allowing interim checking of the frame during the straightening process.

Another object of the present invention is to provide an alignment checking means which does not require adjustments or skilled knowledge to use.

Another object of the present invention is to provide a vehicle frame alignment determining tool which is static in structure and yet highly accurate in use.

Other objects and advantages of the present invention will become apparent and obvious from a study of the following description and the accompanying drawings which are merely illustrative of such invention.

DETAILED DESCRIPTION OF INVENTION

With further reference to the drawings, the frame alignment indicating means of the present invention, indicated generally at 10, includes an elongated indicator arm 11, with an outwardly projecting guide 12 secured to one end thereof.

Figure 1:
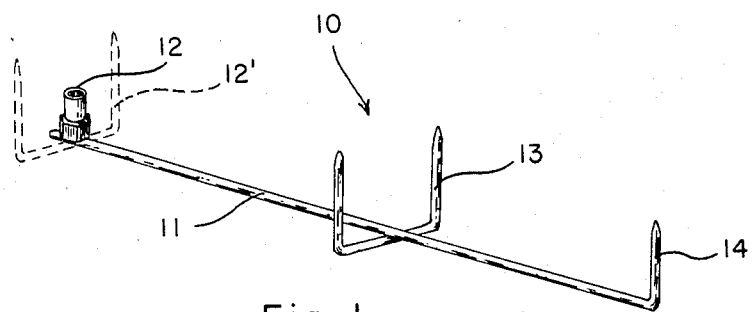
FIG. 1 is a top perspective view of the frame alignment indicator of the present invention.
Figure 2:
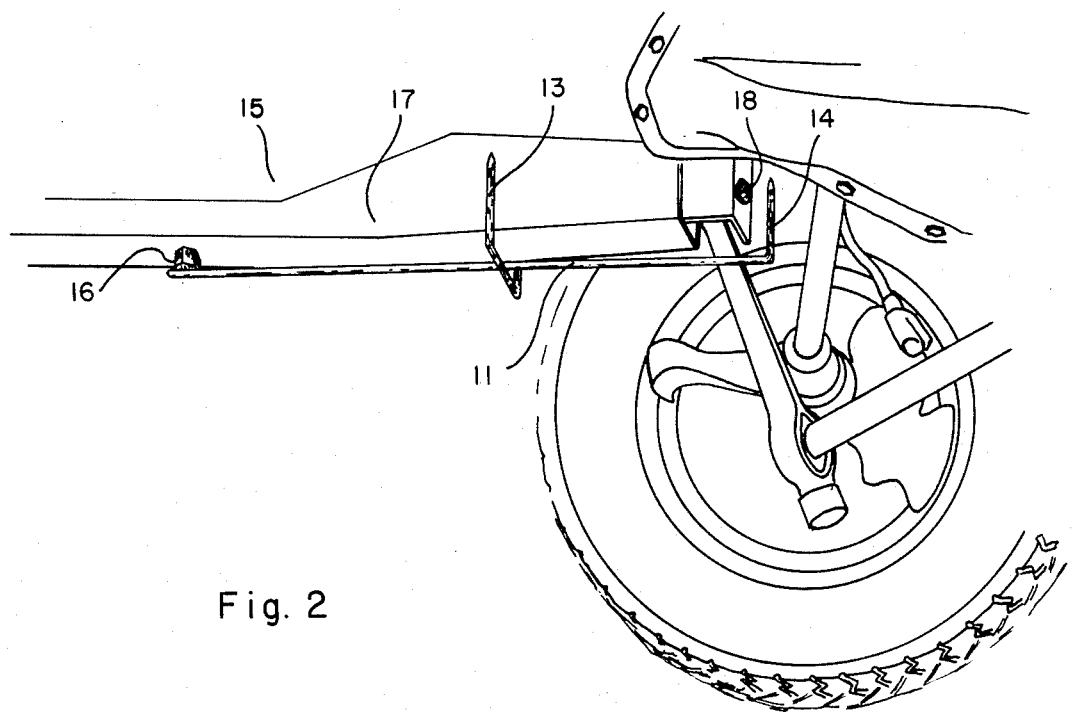
FIG. 2 is a bottom perspective view of such indicator mounted on the frame of the vehicle.
Figure 3:
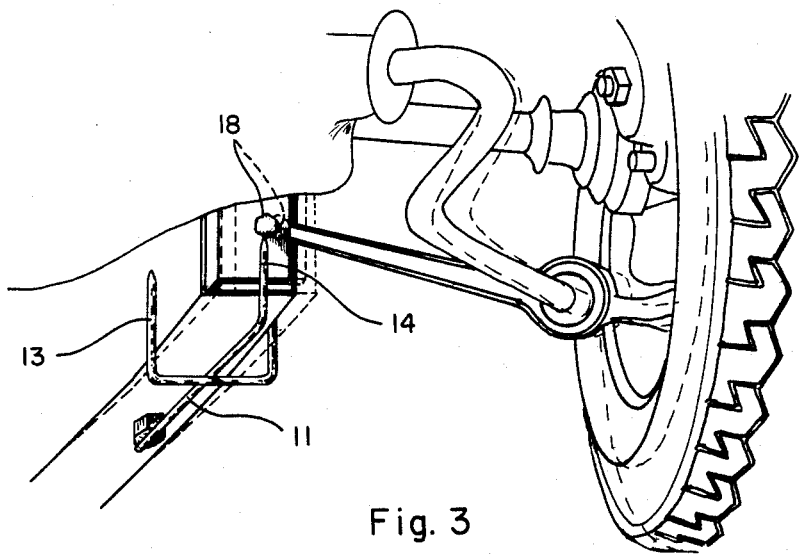
FIG. 3 is a front perspective view of the indicator showing the frame in alignment and out of alignment

A generally U-shaped frame clip 13 is secured to the indicator arm 11 intermediate its ends. The end of indicator arm 11 opposite guide 12 includes an outwardly projecting indicator finger 14 as can clearly be seen in FIG. 1.

In a high percentage of production automobiles, generally circular openings are provided in the frames thereof. Guide 12 is adapted to be inserted into one of these openings. Should certain vehicles not have standard openings, a second U-shaped frame clip could be substituted for guide 12.

To use the indicator means of the present invention, the vehicle 15 is disposed in a work position such as on a lift (not shown). The guide 12 is disposed within the standard opening 16 found in the lower portion of frame 17. The U-shaped frame clip 13 is disposed on either side of said frame 17 and since such clip is preferably formed from a material having a memory, for example spring steel, its relative position to said frame will be maintained.

The user of the frame alignment indicating means 10 of the present invention then looks at the end of the frame and if the indicator finger 14 is in alignment with a pre-determined point such as bolt 18, then the frame 17 is in alignment. On the other hand, if the frame 17 is bent or curved between guide 12 and indicator 14, said indicator will not be in alignment with said pre-determined point 18 and thus the bent frame condition can be immediately recognized as well as the amount of misalignment determined as shown in dotted lines 18.

During the straightening process, the indicator means 10 of the present invention can be snapped into place to check alignment progress thus allowing the user thereof to obtain accurate alignment without over bending.

Once the alignment check has been made, the means of the present invention can be as readily be removed from the frame as it was mounted thereon.

From the above, it can be seen that the present invention has the advantage of providing a simple, relatively, inexpensive, and yet highly accurate frame alignment indicating means which is readily attachable and detachable from the frame of the vehicle it is used in conjunction with.

The present invention can, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A static vehicle frame alignment indicator means comprising: an elongated indicator arm; indicator finger means secured to said elongated indicator arm adjacent one end thereof; and means for attaching said indicator arm to a vehicle frame member such that said indicator finger means extends beyond the end of said frame member, said attaching means including a first connector means secured to the end of said indicator arm opposite said indicator finger means and a second connector means secured to an intermediate portion of said indicator arm whereby when said first and second connector means are mounted on said frame member said indicator finger means will provide a visual indication of whether said frame member is in proper alignment.

2. The indicator means of claim 1 wherein said first connector means is a stud like guide means.

3. The indicator means of claim 1 wherein said second connector means is a generally U-shaped clip means.

4. The indicator means of claim 3 wherein said U-shaped clip means is formed from a material having a memory.

5. The indicator means of claim 4 wherein said material having a memory is spring steel.

6. The indicator means of claim 1 wherein said indicator finger means is disposed at approximately ninety degrees to the longitudinal axis of said elongated indicator arm.

7. The indicator means of claim 1 wherein said first connector means is U-shaped clip means.

8. The indicator means of claim 7 wherein said U-shaped first connector means is formed from a material having a memory.

9. The indicator means of claim 8 wherein said material having a memory is spring steel.

* * * * *